United States Patent [19]
Hajek, Jr.

[11] 3,879,013
[45] Apr. 22, 1975

[54] CHECK-TYPE DRAIN VALVE

[75] Inventor: Thomas J. Hajek, Jr., Joliet, Ill.

[73] Assignee: Caterpillar Tractor Company, Peoria, Ill.

[22] Filed: Oct. 27, 1972

[21] Appl. No.: 301,464

[52] U.S. Cl. ......... 251/144; 251/149.6; 137/543.19
[51] Int. Cl. .......................................... F16k 15/18
[58] Field of Search............. 251/144, 149.1, 149.6; 137/543.15, 543.17, 543.19, 543.23, 515.7, 322, 533.17, 533.19, 533.31, 543

[56] References Cited
UNITED STATES PATENTS

| | | | |
|---|---|---|---|
| 1,067,583 | 7/1913 | Brague | 137/322 |
| 1,550,275 | 8/1925 | Mullins | 251/144 X |
| 1,644,265 | 10/1927 | Noble | 137/543.23 X |
| 1,828,697 | 10/1931 | Yardley | 137/543.23 X |
| 1,980,063 | 11/1934 | Jensen | 251/144 |
| 2,164,039 | 6/1939 | Meyer et al. | 251/144 |
| 3,387,621 | 6/1968 | Schaff | 137/322 |
| 3,507,299 | 4/1970 | Murdock | 251/144 |
| 3,665,946 | 5/1972 | Robinson | 251/144 X |
| 3,746,059 | 2/1973 | Mizuguchi | 137/322 X |

*Primary Examiner*—William R. Cline
*Attorney, Agent, or Firm*—Phillips, Moore, Weissenberger Lempio & Strabala

[57] ABSTRACT

A check-type drain valve assembly for a hydraulic fluid storage tank having a plug equipped drain port at the bottom thereof. A spring-retaining cage member extends through an aperture in the storage tank to the interior thereof. An externally mounted adapted member firmly clamps the cage member in position and also acts as a threaded retainer for a drain plug or for the threaded coupling of a drain tube. A spring loaded fluted check valve is mounted within said cage member and is spring biased into abutting engagement with the drain plug or tube coupling when the drain plug or coupling is inserted in the adapter member. The check valve positively closes off the drain port when the drain plug is removed. The spring loaded check valve is adapted to open and allow the flow of hydraulic fluid from the tank only when a drain tube or other fitting is sealingly inserted into the drain port.

3 Claims, 3 Drawing Figures

PATENTED APR 22 1975  3,879,013

CHECK-TYPE DRAIN VALVE

BACKGROUND OF THE INVENTION

Most fluid storage tanks, including lubricating oil tanks and hydraulic fluid tanks, contain a drain plug which is secured to an appropriate fitting in closing relation to a drain port in or near the bottom of such tank.

Hydraulic fluid storage tanks for large earth-moving vehicles are frequently mounted in locations which require the use of a flexible tube for periodic draining because the drain port is sometimes directly inaccessible. In some cases, during the draining operation with such a flexible tube, fluid begins draining from the tank even before the drain plug is completely removed and such flow becomes profuse before a flexible drain tube can be connected to the drain port and sealingly tightened therein. This is especially true when a substantial hydrostatic head exists within the tank. Such predraining frequently results in an uncontrollable, relatively wide spraying of fluid from the drain connection; an unsanitary and unpleasant condition.

A system which attempts to solve this problem is disclosed in U.S. patent application Ser. No. 302,774, now abandoned entitled Drain Valve Assembly, filed on Nov. 1, 1972, by John A. Junck and Neil W. Kroth, and of common assignment herewith. In that application, a drain valve assembly is disclosed wherein a right angle or elbow fitting is attached to the drain port of a storage tank and wherein a valve disc-containing body member is attached to the right angle or elbow fitting. By means of the manual manipulation of the body member, the valve disc closure member engages, in self-aligning relationship, an end portion of the right angle fitting to selectively permit or close-off fluid communication with the storage tank. The disclosed assembly is intended for use in lieu of a drain plug and allows tank drainage without the disconnection or removal of a drain plug.

The instant invention contemplates the continued use of a removable drain plug while providing the flow control and flexibility offered by the disclosure of the copending application.

Some examples of prior art attempts to solve related problems in environments other than earthmoving vehicle hydraulic fluid storage tanks, are provided by U.S. Pat. Nos. 2,706,646; 2,708,589 and 2,713,874.

The present invention is directed to a check-type drain valve assembly which effectively solves the above-enumerated problems and which does so economically and efficiently.

SUMMARY AND OBJECTS OF THE INVENTION

The instant check-type drain valve assembly comprises means for temporarily discontinuing the flow of fluid from a hydraulic fluid storage tank upon removal of the drain plug therefrom while also providing a positive locking and closure means for permanent or semi-permanent closure of the tank. The assembly comprises a cage member which is adopted to be inserted internally of the tank through an aperture therein and to be disposed partially interiorly thereof and to retain a spring loaded check valve member. A threaded adapter member is attached to the storage tank to hold the cage member in place while simultaneously providing an internally threaded port means for receiving a drain plug or drain tube. With the drain plug in place, a portion of the check valve abuts the plug and another portion approaches a stop portion of the cage member. When the drain plug is removed, as when it is desired to attach a flexible hydraulic fitting, the check valve is positively biased into closing engagement with the drain port of the storage tank to prevent fluid flow therefrom by temporarily closing off the drain port until such time as a flexible drain tube or the like is sealingly attached to the drain port at which time the check valve again moves to an open or fluid communicating position.

It is an object of the present invention to provide an improved check-type drain valve assembly for a hydraulic fluid storage tank in an earthmoving vehicle.

Another object of the present invention is to provide an improved check-type drain valve assembly which is capable of reducing the time and effort required to open and drain fluid from a hydraulic fluid storage tank.

Yet another object of the present invention is to provide an improved check-type drain valve assembly which is simple to install a unit in the drain port of a storage tank and which is simple and inexpensively fabricated from few parts.

Still another object of the present invention is to provide a check-type drain valve assembly which enables the connection of a flexible hydraulic fluid carrying tube to a relatively inaccessible drain port of a hydraulic fluid storage tank without spillage of fluid during the connection operation.

Other objects and advantages of the present invention will become apparent upon reference to the accompanying drawings and following description.

DETAILED DESCRIPTION

Figure 3:
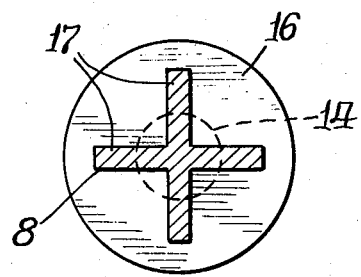
FIG. 3 is a transverse cross-sectional view taken along the line III—III of FIG. 1.

Referring more particularly to the drawing, the bottom or floor portion of a partially illustrated hydraulic fluid storage tank is shown at 1. A sub-floor or guard portion is shown at 2. A drain plug is indicated at 3 and is threadably connected to the check-type drain valve assembly of the present invention. Mounted upon the storage tank bottom and protruding into an enlarged aperture 4 in the tank bottom is an adapter member 5. The adapter member is secured to the tank bottom by means of bolts 6 or like fasteners. The adapter member is equipped with a threaded bore 7 which is adapted to receive the drain plug 3 as well as the check valve fluted portion 8. Threaded bore 7, constitutes the effective drain port for the storage tank. The adapter member also has an annular recess portion 9 proximate flanged portions 10 through which the bolts 6 extend. The annular recess 9 receives a flanged portion 11 of a stepped cage member or spring retainer 12. Cage member 12 receives and retains a valve biasing spring 13 and a spring guide stem portion 14 of a check valve shown generally at 15. The check valve 15 has a reduced dimension tapered fluted portion 8 which acts as a guide member for the check valve within the drain port 7. A seat or flange portion 16 of the check valve serves, on an upper portion thereof, as an abutment member for the spring 13 and also as a stop surface for engagement with the cage member 12. A fluted portion of the valve 8 is shown clearly in FIG. 3 to consist of four equiangularly spaced fins 17 which serve to guide the check valve within the port 7 while allowing an unobstructed flow path for fluid from the storage tank, when desired.

Figure 1:
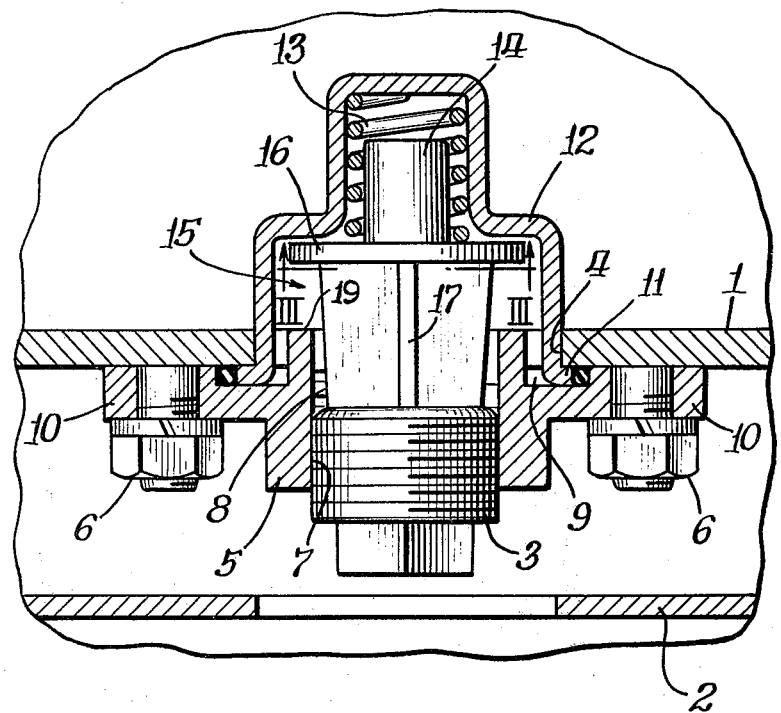
FIG. 1 is a longitudinal, vertical, partially-sectional front elevation of the check-type drain valve assembly of the present invention.

Assembly of the check-type drain valve in the storage tank drain area is accomplished by inserting the cage member 12 through the aperture 4 in the bottom of the tank, inserting the spring 13 into the cage member, placing the check valve 15 into the cage with the stem portion 14 received by the spring, affixing the adapter member 5 in the position shown in FIG. 1 and tightening down the bolts 6 to complete the assembly. A seal member 18, which could be an elastomeric ring or the like, is provided in the recess 9 radially exteriorly of the flange portion 11 to provide fluid sealing between the parts of the completed assembly.

Figure 2:
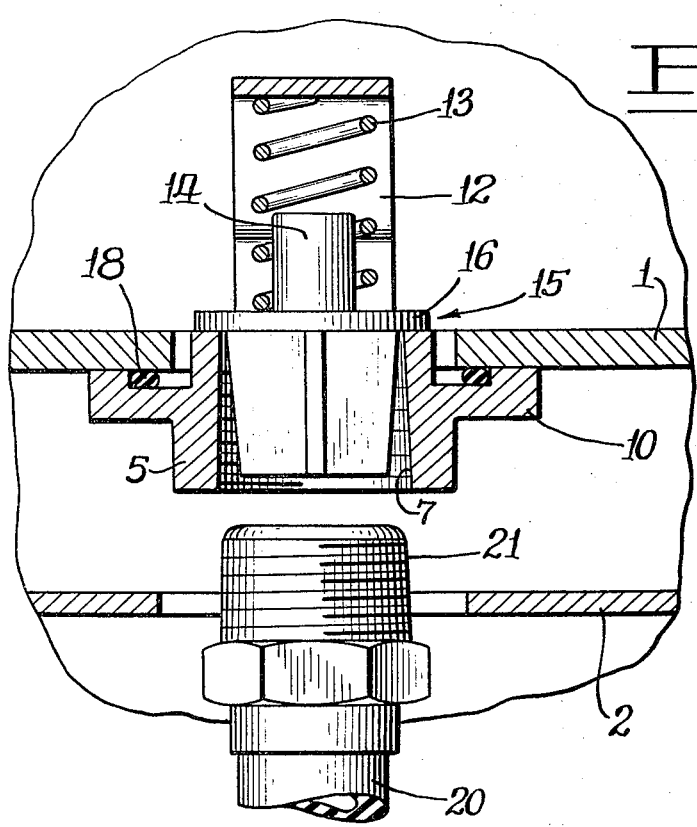
FIG. 2 is a side elevation similar to FIG. 1 but showing the check-type drain valve assembly in closed disposition just prior to the connection of a flexible hydraulic tube to the drain port.

The operation and functions of the valve assembly are best appreciated with concurrent reference to FIGS. 1 and 2.

In FIG. 1, the valve assembly as disposed is shown with the drain plug 3 in place and closing off fluid flow. It should be noted that the tapered fluted section of the valve makes contact with the drain plug 3 and is moved upwardly thereby so that the flange portion 16 is held out of contact or seating engagement with the seat portion 19 of the adapter member 5. In this normal disposition of the parts, the drain plug 3 is firmly threaded into the drain port to provide a positive seal for retaining fluid within the storage tank.

When it is desired to drain fluid from the tank and to affix a flexible tube 20 or the like to the drain port for that purpose, the plug 3 is removed. As the drain plug is threaded axially outwardly for removal, the fluted section of the check valve which rests upon the plug moves therewith and, at the point where the plug no longer seals the port 7, the annular flange portion 16 of the valve has already seated upon the seat portion 19 to provide positive sealing of the drain port under the influence of the coil spring 13. Upon complete removal of the plug 3, only a minute quantity of hydraulic fluid, if any, would be lost. This amount would consist of fluid trapped between the plug 3 and the flange 16. To complete the draining procedure, a threaded fitting 21 of the flexible hose or tube 20 would be turned into the drain port 7 in the same manner as the drain plug 3. As the coupling 21 is threaded into the drain port, it would make contact with the fluted portion of the check valve and move said check valve upwardly against the bias of the spring 13 to unseat the flanged portion 16 to allow fluid communication between the interior of the storage tank and the flexible tube 20 for disposal of the fluid. Upon completion of the draining operation, the flexible tube 20 would be uncoupled and removed and the drain plug 3 would be replaced to again positively seal the storage tank for subsequent filling.

In view of the foregoing, it should be readily apparent that the structure of the present invention provides an improved check-type drain valve which is simple in operation, inexpensively fabricated, and which provides a temporary seal for the hydraulic fluid storage tank at such time as the drain plug therefor is removed.

While the invention has been described and shown with particular reference to the preferred embodiments, it should be apparent that variations are possible which would fall within the spirit of the present invention, which invention is not intended to be limited, except by the scope of the appended claims.

I claim:

1. A combination drain assembly for controlling the flow of fluid from a storage tank comprising; adapter means having passage means therein for communicating fluid from said storage tank to the exterior thereof, check valve means movably mounted within said passage means for selectively opening and closing said passage means to respectively permit and prevent fluid flow from said storage tank to said passage means, biasing means for constantly urging said check valve means toward a passage means closing position, cage means for retaining said biasing means in position, closure plug means selectively insertable in said passage means for closing off said passage and for directly engaging and urging said check valve means toward a position in which it does not block the flow of fluid from said storage tank to said passage means, said cage means including a unitary stepped member having a first portion for engaging said check valve means and having a second portion for engaging said adapter means, said check valve means including a valve body having a stem portion and a fluted portion, said portions being interconnected by an enlarged seating portion, said enlarged seating portion comprising an annular flange disc having first and second substantially flat surfaces thereupon and wherein said first surface is adapted to coact with said stepped member to limit movement of said valve body in a first predetermined direction and wherein said second surface is adapted to sealingly engage said adapter means to close off said passage means upon removal of said closure plug means from said passage means.

2. The invention of claim 1 wherein said biasing means is a coil spring surroundingly mounted upon said stem portion and engaging both said first substantially flat surface and said stepped member.

3. A check-type drain valve assembly for controlling the flow of fluid from a storage tank comprising; adapter means having passage means therein for communicating fluid from said storage tank to the exterior thereof, check valve means movably mounted within said passage means for selectively opening and closing said passage means, biasing means for constantly urging said check valve means toward a passage means closing position, cage means for retaining said biasing means in position, engaging means selectively insertable in said passage means for directly engaging and urging said check valve means toward a passage means opening position, said cage means including a stepped member having a first stepped portion for engaging said check valve means and having a second stepped portion for engaging said adapter means, said check valve means including a valve body having a stem portion and a fluted portion, said portions being interconnected by an enlarged seating portion, said enlarged seating portion comprising an annular flange disc having first and second substantially flat surfaces thereupon and wherein said first surface is adapted to coact with said stepped member to limit movement of said valve body in a first predetermined direction and wherein said second surface is adapted to sealingly engage said adapter means to close off said passage means upon removal of said engaging means from said passage means.

* * * * *

UNITED STATES PATENT OFFICE
CERTIFICATE OF CORRECTION

PATENT NO. : 3,879,013
DATED : April 22, 1975
INVENTOR(S) : Thomas J. Hajek, Jr.

It is certified that error appears in the above-identified patent and that said Letters Patent are hereby corrected as shown below:

On the Title Page, Item [73], change the spelling of the assignee's corporate name from "Caterpillar Tractor Company" to --- Caterpillar Tractor Co. ---.

Signed and Sealed this fifth Day of August 1975

[SEAL]

Attest:

RUTH C. MASON
Attesting Officer

C. MARSHALL DANN
Commissioner of Patents and Trademarks